United States Patent
Borque Marquina et al.

(10) Patent No.: US 8,047,025 B2
(45) Date of Patent: Nov. 1, 2011

(54) TUB FOR WASHING MACHINE

(75) Inventors: Noelia Borque Marquina, Zaragoza (ES); Miguel Angel Gomez Caudevilla, Zaragoza (ES); Ismael Gracia Bobed, Zaragoza (ES); Alberto Mañas Molina, Zaragoza (ES); Eduardo Recio Ferrer, Zaragoza (ES)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 483 days.

(21) Appl. No.: 12/225,984

(22) PCT Filed: Mar. 15, 2007

(86) PCT No.: PCT/EP2007/052454
§ 371 (c)(1),
(2), (4) Date: Oct. 3, 2008

(87) PCT Pub. No.: WO2007/115894
PCT Pub. Date: Oct. 18, 2007

(65) Prior Publication Data
US 2009/0165506 A1      Jul. 2, 2009

(30) Foreign Application Priority Data

Apr. 12, 2006   (ES) .................................. 200601041

(51) Int. Cl.
*D06F 37/26*      (2006.01)
(52) U.S. Cl. ........................................................ 68/142
(58) Field of Classification Search .................... 68/140, 68/142
See application file for complete search history.

(56) References Cited

U.S. PATENT DOCUMENTS

| | | | | |
|---|---|---|---|---|
| 2,330,421 A | * | 9/1943 | Haberstump | 68/144 |
| 4,423,607 A | * | 1/1984 | Munini | 68/23.2 |
| 5,419,164 A | * | 5/1995 | Durazzani | 68/23.2 |
| 5,433,091 A | * | 7/1995 | Durazzani et al. | 68/140 |
| 5,657,650 A | * | 8/1997 | Lee et al. | 68/23.5 |
| 6,681,602 B2 | * | 1/2004 | Heyder et al. | 68/140 |
| 2004/0123633 A1 | * | 7/2004 | Jo | 68/23 R |
| 2005/0005652 A1 | * | 1/2005 | Park et al. | 68/24 |
| 2007/0113597 A1 | * | 5/2007 | Kim | 68/140 |

FOREIGN PATENT DOCUMENTS

EP          0 601 347          6/1994
(Continued)

OTHER PUBLICATIONS

International Search Report PCT/EP2007/052454.

*Primary Examiner* — Joseph L Perrin
(74) *Attorney, Agent, or Firm* — James E. Howard; Andre Pallapies

(57) ABSTRACT

A tub (1) for a clothes washing-machine, in particular of the domestic type which houses a rotating drum (2) within which the washing load is placed, said washing tub (1) consisting of a peripheral cylindrical housing formed by a tub front section (3) and a tub rear section (4) which are joined at their respective plastic material edges (31, 41), enclosing the drum (2) in their interior, by the fusion welding of the plastic materials of said edges (31, 41), forming a weld bead (5a, 5b) between the tub front section (3) and the tub rear section (4) where the edges (31, 41) are joined by at least two joining lines (51, 52, 53, 54), forming at least one chamber (6, 61) between the edges (31, 41) along at least part of the weld bead (5a, 5b).

20 Claims, 3 Drawing Sheets

FOREIGN PATENT DOCUMENTS

| | | |
|---|---|---|
| EP | 1 182 291 | 2/2002 |
| EP | 1 522 624 | 4/2005 |
| ES | 2238153 A1 | 8/2005 |
| GB | 2 189 511 | 10/1987 |

* cited by examiner

TUB FOR WASHING MACHINE

BACKGROUND OF THE INVENTION

This invention, as expressed in the title of this specification, relates to a tub for a clothes-washing machine, in particular of the domestic type which houses a rotating drum inside which the washing load is placed; said washing tub consisting of a peripheral, cylindrical housing formed by a tub front-section and a tub rear-section which are joined together at their respective plastic material edges in order to enclose the drum in their interior by means of the fusion welding of the plastic materials of said edges, forming a weld bead between the front and rear sections.

The majority of the tubs existing on the domestic washing-machine market with moulded plastic washing tubs are joined by means of assembly with clips and/or screws. The joint is carried out by joining, by means of clips, the tub front section with the tub rear section, which incorporates the internal features, already assembled, such as the drum, the shaft, etc.

The joining of tubs by means of welding is not new on the market. Among the different welding techniques existing, the most commonly used is welding by vibration. Said vibration may be produced by means of ultrasonics or by friction, and the melting of the material at the joint is based on the application of pressure in order to produce close contact between the items to be welded. In comparison with the solution of tubs joined by means of clips, welded tubs allow the elimination of screws, clips and also the watertight seal, whose inclusion is rendered unnecessary.

Document EP 601 347 B1 discloses a washing-machine, or combined washing- and drying-machine, in particular of a domestic type, which comprises a plastic washing tub which houses a rotating drum within which the washing load is placed; said washing tub consisting essentially of a peripheral, cylindrical, integral housing, with a rear wall and a flange-shaped front wall which incorporates protrusions, moulded separately for their subsequent joining to protrusions on the front opening of the tub by means of the fusion welding of the plastic materials of which said protrusions are made.

Welding of the tubs is usually carried out by means of placing the flat sides of the protrusions face-to-face. The protrusions of the tub and of the front wall are L-shaped in section, and by means of welding, two edges of the protrusions are mutually joined. The pressure is exerted on both joined edges of the protrusions Welding forms part of the group of permanent joints, but unlike others such as riveting or sticking, it provides certain advantages, such as the speed of manufacture, the high resistance of the joint, and the versatility of the joining process, applicable to a great number of materials and therefore appropriate for polymers or polymer-based compound materials, as is the case with current washing-machine tubs.

BRIEF SUMMARY OF THE INVENTION

The object of this invention is a more watertight joint for washing-machine tubs which are closed by a system of plastic welding.

This objective is achieved with a tub for a clothes washing-machine, in particular of a domestic type which houses a rotating drum within which the washing load is placed, the washing drum consisting of a peripheral cylindrical housing formed by a tub front section and a tub rear section which are joined along their respective plastic material edges, enclosing the drum in their interior, by means of the fusion welding of the plastic material of said edges, forming a weld bead between the front and rear sections where the edges meet along at least two joining lines, forming at least one chamber between the two, along at least part of the weld bead.

In this way, the joint between the two parts of the tub is joined along two joining lines, forming a chamber where the water will collect in the event that the inner joining line should develop any problem of watertightness.

It also possesses the advantage of being a much more resistant and at the same time more flexible joint compared with the state of the art. This welded joint has a greater surface area, which increases its inertia and therefore its resistance to bending and twisting forces.

At least one of the edges features a base surface to which at least one extension of the opposite edge from a respective base surface is joined, defining at least one of the joining lines along the weld bead. In this way, the base surfaces of both edges are separated by this extension, while being joined by the same.

In a preferred embodiment, both edges feature a respective base surface to which at least one extension of the opposite edge is joined, defining at least two joining lines along the weld bead and at least one chamber between the edges. Thus, the joint of the tubs is formed by the joining of the extensions of the edges to the base surfaces of the edges, thus facilitating the closing process as one of the extensions of one of the edges is located further inside the tub, also facilitating the centring of the other edge.

In another embodiment, one of the edges features a base surface to which at least two extensions of the opposite edge are joined, forming at least two joining lines along the weld bead and at least one chamber between the two edges, the chamber being formed directly on one of the edges.

Thus, the chamber will be defined by the space formed between the base surfaces of both edges and the extensions, along the weld bead.

The base surfaces are substantially flat, parallel with each other, and perpendicular to an external surface of the tub. In this way, assembly and closing of the tub is easier, positioning the base surfaces of the tub front and rear sections face-to-face.

The chamber is formed between the edges, from the lowest point of the tub when this is in its working position. In this way, the watertightness of the lowest part of the tub, which is where most water may collect, is guaranteed.

In another embodiment, the chamber is formed between the edges along the entire weld line, forming a watertight enclosure, and making the entire washing tub watertight.

The tub is made of plastic material. Thus, the tub front section and its respective edge, and the tub rear section and its respective edge may each be manufactured as a single part, with no need for double plastic injection or additional joins between the sections of the tub and the edges.

The washing-machine is of the front-loading type, with an opening in the tub front section for the insertion of the washing load.

The system of closure by welding is that of closure by vibration and pressure, which is the most suitable for this type of part. As a consequence of having two separate welding sections instead of a single one, less heat is concentrated at the area to be welded. Besides, the heat disperses better, as it has an inner convective surface. In short, is achieved that the surroundings of the weld area suffer less.

BRIEF DESCRIPTION OF THE DRAWINGS

To complement the description which is to be made below, and in order to aid a better understanding of the characteristics of the invention, a set of drawings is attached to this specification, the drawings portraying preferred embodiments of the invention.

DETAILED DESCRIPTION OF THE PRESENT INVENTION

Figure 1:
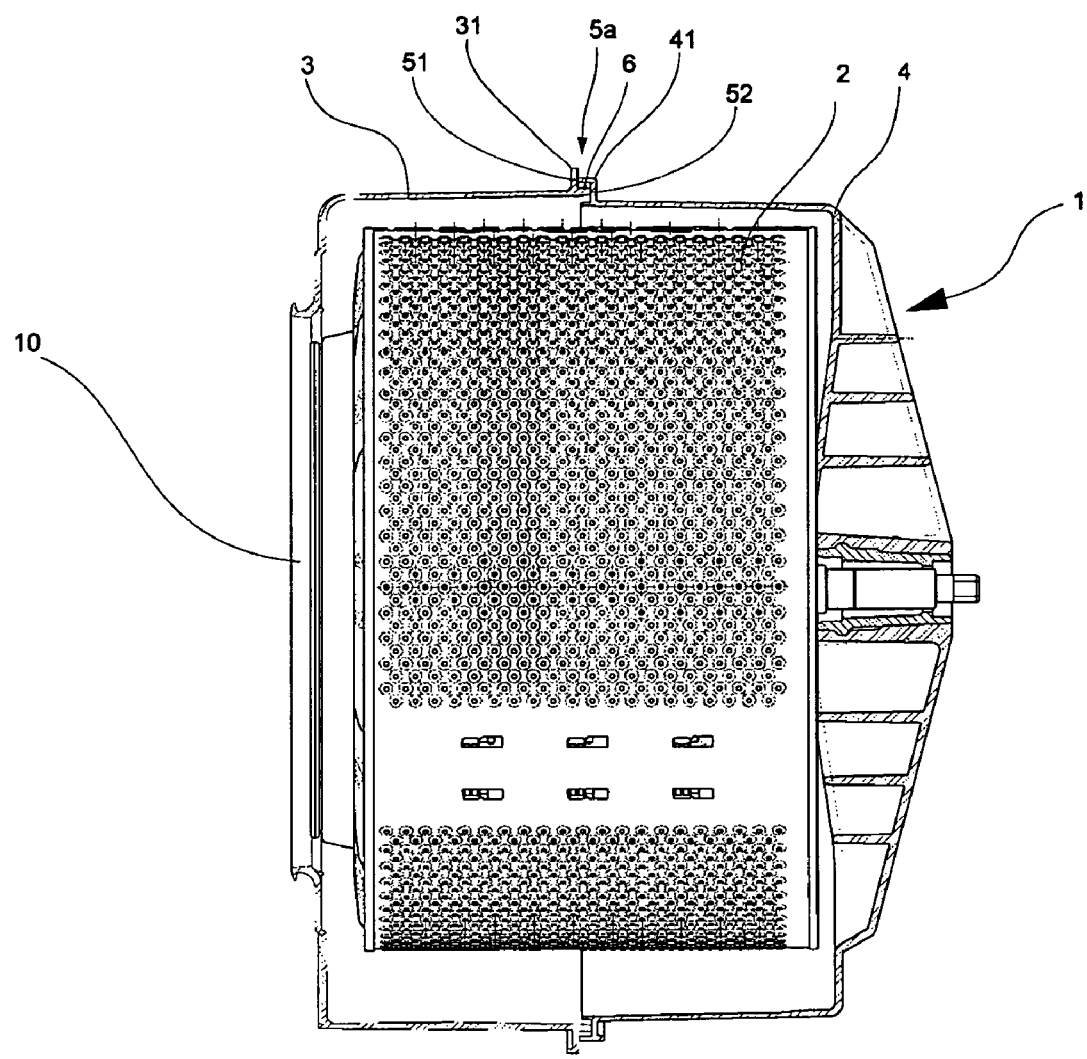
FIG. 1.—Portrays the profile of a washing tub in section, with the drum inserted into its interior.
Figure 2:
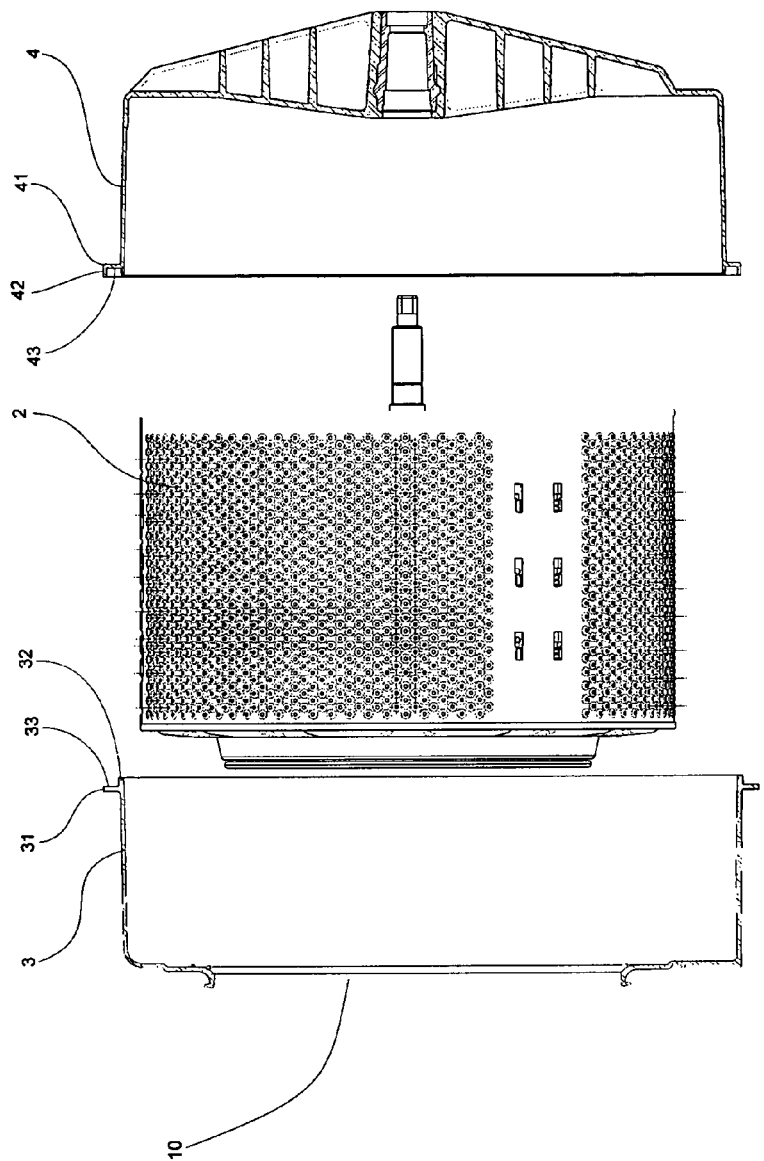
FIG. 2.—Portrays an exploded view of the tub in FIG. 1.
Figure 3:
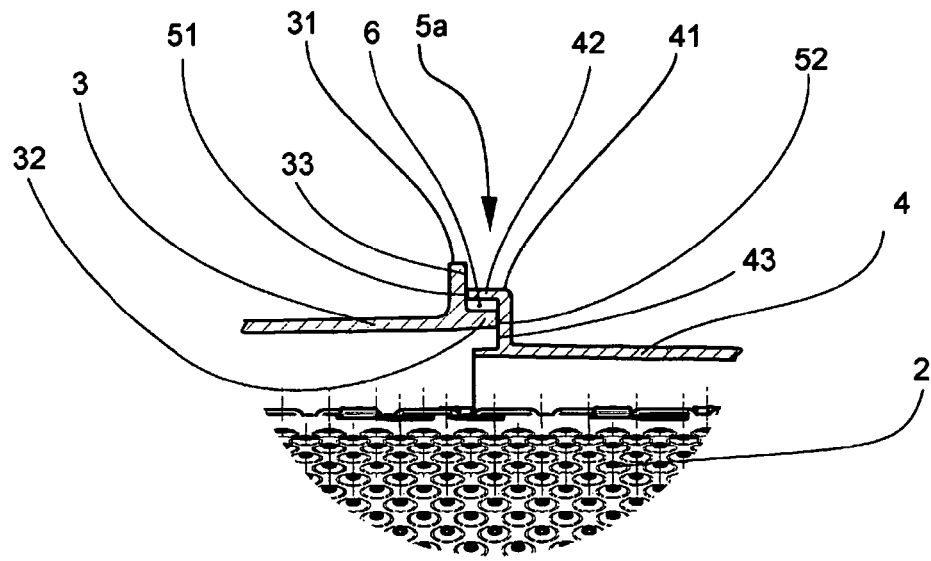
FIG. 3.—Portrays a detailed sectional view of the joint between the tub front and rear sections.

FIG. 1 portrays a schematic section of a tub 1 for a clothes washing-machine, in particular of a domestic type, which houses a rotating drum 2 within which the washing load is placed. The washing-machine is of the front-loading type, with an opening 10 in the tub front section 3 for the insertion of the washing load.

The tub 1 is manufactured from plastic by moulding and comprises a peripheral cylindrical housing made from two parts, a tub front section 3 and a tub rear section 4 which are joined along their respective open edges 31, 41, enclosing the drum 2 in their interior, by means of fusion welding of the plastic materials of the edges 31, 41, producing a weld bead 5a between the tub front section 3 and the tub rear section 4. The system for closing the same by welding is the system of closure by vibration.

The edges 31, 41 are joined along at least two joining lines 51, 52, forming a chamber 6 between the edges 31, 41 along the perimeter of the weld bead 5a.

The edges 31 and 41 feature a flat base surface 33 and 43, parallel with each other, and perpendicular to the external surface of the tub 2. Each of the edges 31 and 41 also comprises an extension 32 and 42 which protrudes beyond the respective base surface 33 and 43, forming the limit of the opening of each of the tub sections. These extensions 32 and 42 stretch along the entire circumference at different radial distances from the axis of the tub, so that during the process of welding by vibration, these extensions do not touch each other and become joined to the base surface of the opposite edge. The joining of each of these extensions to the flat surfaces of the edges defines a joining line 51 and 52 along the line of the weld bead 5a.

The chamber 6 is defined by the space formed between the base surfaces 33 and 43 of both edges 31 and 41 and extensions 32 and 42 along the weld bead 5a. The chamber 6 extends from the lowest point of the tub 2 in its working position, towards the highest point, thus being watertight. Preferably, the chamber formed should surround the entire tub by the weld bead 5a.

Figure 4:
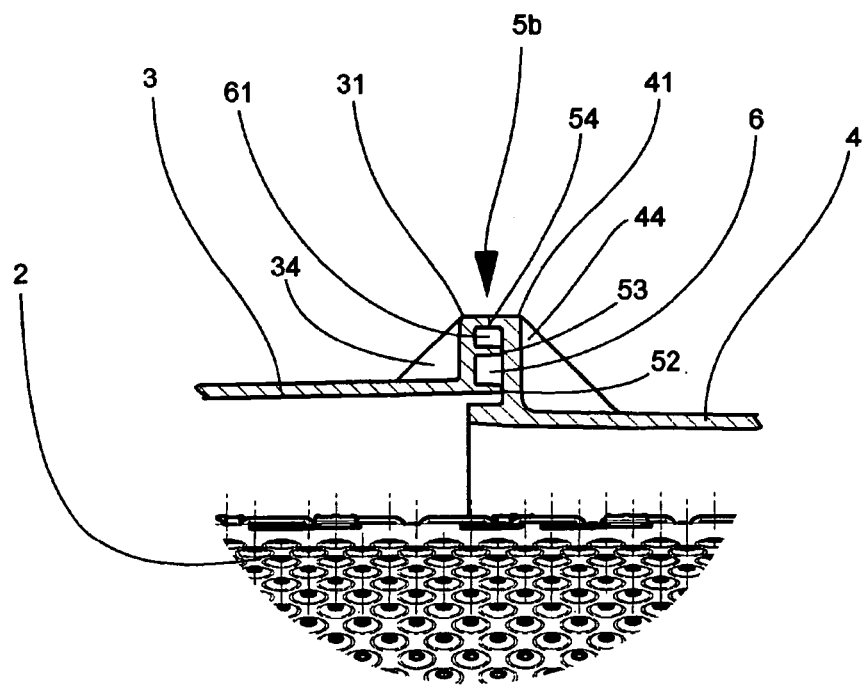
FIG. 4.—Portrays a detail of a simplified embodiment of the invention in FIG. 3.

In another embodiment of the weld bead 5b portrayed in FIG. 4, between the edges 31 and 41, formed by the joint between the base surfaces 33 and 43 from which the extensions protrude. Specifically, three extensions protrude from the front section, two of which are joined to the base surface 41 of the rear section 4, forming two joining lines 52 and 53, closing the watertight chamber 6, and the third extension is joined to another extension on the opposite edge, closing the watertight chamber 61.

The extensions stem from either of the two base surfaces, to meet the opposite surface or another extension of the opposite edge, enclosing the number of chambers desired between the two base surfaces and the extensions.

During the welding process it is foreseen that part of the plastic material of the extensions, to a distance of at least one millimeter, will be melted on joining the two sections of the tub. In this way, any irregularities which may exist on the base surface, where it is joined to an extension, may be overcome.

The design suggested by the invention for this welded joint increases the resistance of the joint against different forces, especially if we compare it with the traditional flat welding between faces. From a joint with a single welded surface, we move to another in which the weld is executed on two different surfaces, located on different planes and separated from each other by the distance occupied by the watertight compartment located between the two. This design eliminates the continuity of the welded surface, which improves its resistance and makes breakage of the joint more difficult. Besides, the thermal effects suffered by the material in the proximity of the weld are minimised.

It may also be advantageous that there should be a variation in the profile of the edges of the tub sections along the weld bead, due to the fact that each part of the bead may have different requirements regarding resistance and flexibility. Springs, dampers, motor mounts, etc. give rise to peculiarities of design at the profiles of the edges, either to reinforce the same or to enable the appropriate pressure of the vibration welding machine. Although this weld has two different weld lines, the operation is executed during the same stage.

It is also advantageous to reinforce the edges with ribs 34, 44 which join the same to the surface of the tub 2, as the vibration welding machine will be rested on the edges at the external projections of the tub which form the base surfaces. Resting the machine on the edge may strain the edge and distort it; for this reason the ribs reinforce the necessary area.

It is not necessary for the base surfaces to be flat, but in being so, better operation of the system of joining by vibration is guaranteed. The extensions are kept generally parallel throughout the weld bead or edge of the front and rear tub sections, and the distance between the extensions of the edges or of a single edge remains constant, although this is not essential. It may be that the extensions, when they belong to a single edge, are joined together as a single extension, if the joint so requires.

The design significantly improves the watertightness of the tub, a characteristic which is essential in order that leaks should not appear during the washing processes. It is relatively common for this problem of leakage to appear if the weld bead is not perfect throughout its perimeter, which on the other hand is difficult to check during the welding process.

With the invention proposed, the water would have to seep through a double wall. It would first have to enter the watertight compartment or chamber through a possible defect in the inner welded wall and then through the outer wall. This is more improbable than if there were only a single welded surface.

The invention claimed is:

1. A tub for a residential clothes washing machine, the tub comprising:
   a tub front section; and
   a tub rear section,
   wherein the tub front section and the tub rear section together form an interior space in which a rotatable drum can be disposed,
   each of the tub front section and the tub rear section having a peripheral edge formed of a plastic material,
   the tub front section and the tub rear section are joined to one another via two fusion weld beads, with the peripheral edge of the tub front section being secured to the tub rear section by a first one of the fusion weld beads at a first discrete joining line and the peripheral edge of the tub rear section being secured to the tub front section by a second one of the fusion weld beads at a second discrete joining line spaced from the first discrete joining line, and the peripheral edges of the tub front section and the tub rear section form at least one chamber along at least part of the fusion weld beads, the chamber being separate from the interior space.

2. The tub according to claim 1, wherein at least one of the peripheral edges features a base surface to which at least one extension of an opposite peripheral edge from a respective base surface is joined, defining at least one of the discrete joining lines.

3. The tub according to claim 1, wherein both peripheral edges respectively feature a base surface to which at least one extension of an opposite peripheral edge is joined, defining the two discrete joining lines and the at least one chamber between the peripheral edges.

4. The tub according to claim 1, wherein one of the peripheral edges features a base surface to which at least two extensions of an opposite peripheral edge are joined, defining at least two joining lines, one of the two joining lines being the first discrete joining line or the discrete second joining line, and the other of the two joining lines being a third discrete joining line, a third fusion weld bead joining the tub front section to the tub rear section along the third discrete joining line, and a second chamber is defined between the two peripheral edges.

5. The tub according to claim 4, wherein the second chamber is defined by the space formed between the base surfaces of both peripheral edges and the extensions.

6. The tub according to claim 5, wherein the base surfaces are substantially flat, parallel to each other and perpendicular to an external surface of the tub.

7. The tub according to claim 1, wherein the chamber is formed between the peripheral edges from the lowest point of the tub when in its working position.

8. The tub according to claim 1, wherein the chamber is located between the peripheral edges along the line of the weld beads forming a watertight enclosure.

9. The tub according to claim 1, wherein the tub is made of plastic material.

10. The tub according to claim 1, wherein the washing machine is of the front-loading type with an opening in the tub front section for the insertion of the washing load.

11. The tub according to claim 1, wherein the system for welding the same closed is a system of closure by vibration.

12. A tub for a residential clothes washing machine, the tub comprising:

a first tub section having a first receiving area;
a second tub section having a second receiving area;
a drum receiving area inside the first tub section and the second tub section;
a first projection projecting from the first tub section toward the second receiving area, the first projection having a first edge formed of a plastic material;
a second projection projecting from the second tub section toward the first receiving area, the second projection having a second edge formed of a plastic material;
a first fusion weld connecting the first edge to the second receiving area along a first joining line;
second fusion weld connecting the second edge to the first receiving area along a second joining line; and
a first chamber located between the first tub section and the second tub section, the first chamber being defined at least in part by the first weld, the second weld, the first projection and the second projection, the first chamber being separate from the drum receiving area,
wherein the first joining line is spaced apart from the second joining line.

13. The tub according to claim 12, further comprising a third projection projecting from the first tub section toward the second receiving area, the third projection having a third edge formed of a plastic material;

a third fusion weld connecting the third edge to the second receiving area along a third joining line; and
a second chamber located between the first tub section and the second tub section, the second chamber being defined at least in part by the first weld, the third weld, the first projection and the third projection, the second chamber being separate from the drum receiving area and separate from the first chamber,
wherein the first joining line is spaced apart from the third joining line, and the second joining line is spaced apart from the third joining line.

14. The tub according to claim 13, wherein the first projection is substantially perpendicular to the second receiving area, and the second projection is substantially perpendicular to the first receiving area.

15. The tub according to claim 14, wherein the third projection is substantially perpendicular to the second receiving area.

16. The tub according to claim 12, further comprising a third projection projecting from the first tub section toward the second receiving area, the third projection having a third edge formed of a plastic material;

a third fusion weld connecting the third edge to the second receiving area along a third joining line; and
a second chamber located between the first tub section and the second tub section, the second chamber being defined at least in part by the second weld, the third weld, the second projection and the third projection, the second chamber being separate from the drum receiving area and separate from the first chamber,
wherein the second joining line is spaced apart from the third joining line, and the first joining line is spaced apart from the third joining line.

17. The tub according to claim 16, wherein the first projection is substantially perpendicular to the second receiving area, and the second projection is substantially perpendicular to the first receiving area.

18. The tub according to claim 17, wherein the third projection is substantially perpendicular to the second receiving area.

19. The tub according to claim 12, wherein the first projection is substantially perpendicular to the second receiving area, and the second projection is substantially perpendicular to the first receiving area.

20. A residential clothes washing machine, comprising:

a housing;
a tub having a first tub section having a first receiving area;
a second tub section having a second receiving area;
a drum receiving area inside the first tub section and the second tub section;
a first projection projecting from the first tub section toward the second receiving area, the first projection having a first edge formed of a plastic material;
a second projection projecting from the second tub section toward the first receiving area, the second projection having a second edge formed of a plastic material;
a first fusion weld connecting the first edge to the second receiving area along a first joining line;

a second fusion weld connecting the second edge to the first receiving area along a second joining line; and a first chamber located between the first tub section and the second tub section, the first chamber being defined at least in part by the first weld, the second weld, the first projection and the second projection, the first chamber being separate from the drum receiving area; and a drum positioned inside the tub receiving area, wherein the first joining line is spaced apart from the second joining line.

* * * * *